United States Patent [19]

Pany

[11] Patent Number: 4,978,009
[45] Date of Patent: Dec. 18, 1990

[54] VIDEO CASSETTE BOX WITH REMOVABLE PANEL

[76] Inventor: William Pany, 1907 Georgia Dr., Whitehall, Pa. 18052

[21] Appl. No.: 441,281

[22] Filed: Nov. 27, 1989

[51] Int. Cl.$^5$ ............................................. B65D 85/00
[52] U.S. Cl. .................... 206/620; 206/387; 229/152; 229/162
[58] Field of Search .................. 229/152, 153, 160.2, 229/162; 206/387, 620, 628

[56] References Cited

U.S. PATENT DOCUMENTS

| | | | |
|---|---|---|---|
| 888,026 | 5/1908 | Moore | 229/152 |
| 2,407,415 | 9/1946 | Graziano | 229/160.2 |
| 2,492,712 | 12/1949 | Ringler | 229/162 |
| 2,547,892 | 4/1951 | Stevens | 206/628 |
| 3,139,979 | 7/1964 | Russell | 206/620 |
| 4,113,086 | 9/1978 | Forbes, Jr. | 229/152 |
| 4,501,359 | 2/1985 | Yoshizawa | 206/387 |

FOREIGN PATENT DOCUMENTS 2201401 9/1988 United Kingdom ................ 206/620

Primary Examiner—Gary E. Elkins
Attorney, Agent, or Firm—Steele, Gould & Fried

[57] ABSTRACT

A box for shipping, display and or/storage of a cassette, such as a video cassette, is folded from a single sheet of material. The folded box has a top, bottom, front, back and opposing end portions. The front portion includes a top edge defining a cutaway portion. The back portion includes a removable closure panel attached to the back along a perforated line, the perforated line also defining a cutaway portion opposing the front cutaway portion. When the box is folded and closed it may be used for shipping and/or storage. When the removable closure panel is torn along said perforation to form a sleeve container for the cassette, the opposing cutaway sections provide means for grasping opposite sides of the cassette.

24 Claims, 1 Drawing Sheet

VIDEO CASSETTE BOX WITH REMOVABLE PANEL

BACKGROUND OF THE INVENTION

1. Field of the Invention

This invention relates to folded paper boxes, and more particularly to a folded paper box for storage and/or display of audio or video cassettes and the like, the box having a tear-off edge panel which normally folds over to close the box, but can also be torn away along a line shaped such that upon removing the tear off panel the remaining box defines a notched area adapted for grasping both opposite sides of the container. Accordingly the box is convertible between a full enclosure, e.g., for shipping, and a pull-out partial enclosure, e.g., for convenient home storage.

2. Description of the Prior Art

Video and audio cassettes, and other articles of similar shape, may be bought in stores or ordered through the mail, and are intended for use numerous times, between which times the cassettes must be stored. The cassette, or a rigid plastic enclosure holding the cassette, is usually supplied in a paperboard box. The boxes in which cassettes are sold and displayed in stores are usually opened by raising an edge flap having a distal end that slides into the box between the contents and a wall of the box. The cassette or the like is replaced by reopening the box edge flap and reclosing it over the cassette. Frequently boxes of this type are insubstantial and are not intended for repeated use over the life of the cassette, the constant opening, closing and reopening manipulation of the end flaps being inconvenient and eventually causing damage to the box. Display boxes also often include transparent panels for viewing the label of the cassette through the box. When cassettes are packaged for mailing, they are generally packaged in boxes which are more sturdy, but still are not structured for convenient repeated reuse because access to the cassette is limited. They usually do not include a see-through panel. Inasmuch as the closure flap interferes with access to the cassette, boxes provided for fully enclosing cassettes are not provided with openings for grasping the cassette to remove it from the box. The edges of the box extend up to or over the edges of the cassette, making the cassette hard to grasp for removal from the box.

Another type of cassette box is more adapted to home storage, being open all along a lateral edge to display a label along the cassette edge and providing easier manual access to the cassette. U.S. Pat. Nos. 4,445,634 and 4,520,927 - Sato both disclose five-sided cassette boxes of this type with aligned cutouts in the box the edge of on opposite faces adjacent the open edge. Both patents disclose folded boxes which do not completely enclose the cassette, leaving one long edge open and providing the cut out areas adjacent that end for cassette removal by grasping the opposite faces of the cassette at the cutouts. The Sato packages are not useful for mailing because they do not enclose or fully engage the cassette.

Paper or paperboard cassette storage boxes can be constructed by folding a single sheet of card stock or durable paper to form an enclosure for a cassette. U.S. Pat. Nos. 4,134,495 - Friedman and 4,438,846 - Stylianou disclose flap closures. U.S. Pat. No. 2,760,710 - Fritz discloses a flap closure, and the adjacent side has a window for viewing the cassette label. U.S. Pat. No. 3,990,574 - Roccaforte discloses an audio cassette box wherein a discrete removable element with a foldover flap is fully and not attached integrally or adhesively to the box. The removable part includes an additional panel that extends inwardly between the contents and the box face panel on a side opposite the side receiving the foldover flap.

Perforations are frequently used in paperboard boxes to define a fold line, being relatively weaker than the adjacent material and thus forming a preferential fold line. The perforations defining fold lines in most foldable storage and display boxes are not intended to define tear strips. Should a user nevertheless tear off a foldable flap, for example along a perforated fold line, the tear proceeds along the right angle edge of the box, leaving the open ended edge of the box extending to the extreme edge of the cassette. Although some of the above cassette boxes employ cutouts for grasping, they do not teach any means to combine perforations or removable closing flaps with a cutout area on both opposite sides of the cassette, as needed for grasping.

There is, therefore, a need for a box which is adapted for both mailing and storage, which utilizes a removable foldover panel and also provides for a area for grasping, facilitating removal of the cassette from the box. Such a combination box in accordance with the invention is useful for protecting the cassette or the like during pre-sale storage and shipping, enclosing it fully, and the same box provides the easy access and removal features of an open end box with cutouts on both sides of the cassette.

SUMMARY OF THE DISCLOSURE

The cassette storage box of this invention is a foldable box for fully enclosing a cassette or similar article, for example for shipping, and also for display and/or storage of the tape cassette while leaving uncovered a lateral side of the cassette, especially a VHS size videocassette. The box is preferably made from an integral sheet of paperboard, card stock or like material. The box has a removable closure panel along one edge, the panel closing over the edge when folded and including an extending distal foldover flap portion that tucks under the facing side. There is a perforated attachment between the removable closure panel and the side wall of the box at which the removable panel is attached, which at least partly runs along the fold line of the closure panel. This perforation also defines a cutout area along the edge of the side wall, dipping inward from the fold line to define the cutout area. The opposite side wall also has an edge including a cutout area aligned with the defined cutout area on the first side. When the removable closure panel (and attached foldover flap portion) of the first box side is torn along the perforation, the panel is removed and a cutout area is formed by which the user can grasp the cassette within the box from both opposite sides. The first and/or second box side further may have a transparent window for viewing the cassette label.

It is, therefore, an object of this invention to provide a cassette box which is convertible for storage/display with a removable closure panel which defines a cutout area for grasping the cassette for removal.

It is another object of this invention to improve the known foldable paperboard box to include facing cutout areas for grasping.

It is yet another object of this invention to provide a foldable paperboard box with grasping means which is sufficiently sturdy and adapted for fully enclosing the contents so as to be useful for mailing.

These and other objects will be more readily ascertainable to one skilled in the art from a consideration of the following figures, description and exemplary embodiments, with the understanding that the drawings are illustrative only and that changes may be made in the specific construction illustrated and described within the scope of the appended claims.

DETAILED DESCRIPTION OF THE PREFERRED EMBODIMENTS

Figure 1:
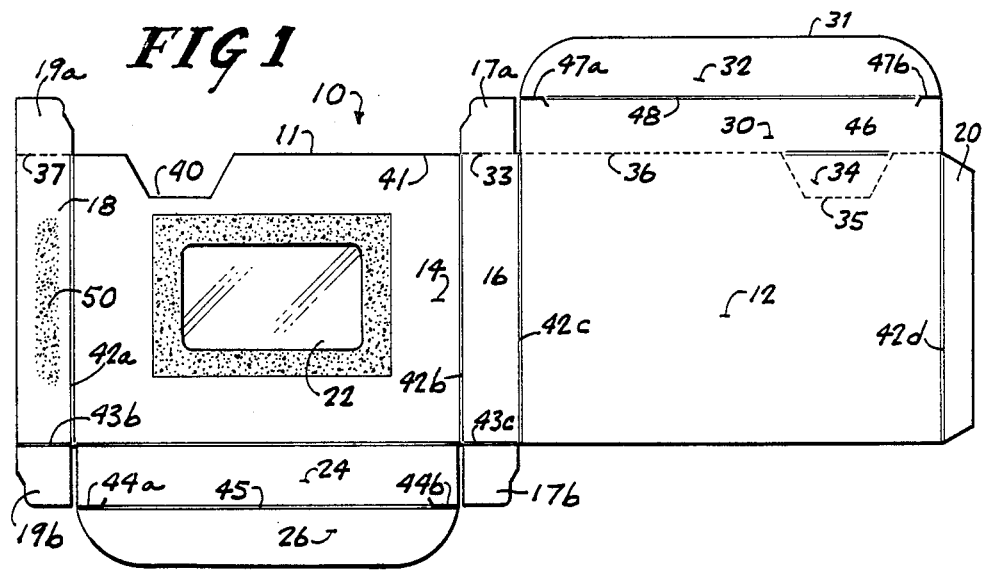
FIG. 1 is a top plan view of the unfolded paperboard blank before assembly.

Referring to the drawings, and more particularly to FIG. 1, a top plan view shows the opened, unassembled blank or sheet 11 of paperboard or the like, which when folded forms the cassette storage/display box 10 of this invention. Sheet 11 is preferably paperboard, card stock, plastic or a plastic-coated paper, foldable vinyl or vinyl-coated board, or any suitably lightweight and sturdy foldable sheet material. If the box is to be used for shipping, the paperboard should be of a slightly heavier weight, for example 0.016 solid bleached sulphate is suitable. In the embodiments illustrated herein, box 10 is configured to store, display or ship a VHS videocassette, the assembled box being approximately 7 ⅜"×5"×1". It should be understood that box 10 is just as easily configured to store, display or ship other articles, especially retangular shapes which are difficult to remove from a close-fitting box, as well as audio tape cassettes (4 1/16"×2 7/16"×½"), or a articles of another size or shape.

Sheet 11 has been cut, scored, and perforated along predetermined lines to facilitate in the assembly of box 10. This can be accomplished by die cutting sheets 11 from one or more thicknesses of stock. Box front 14 and back 12, and ends 16,18, are positioned first by folding sheet 11 to a right angle along fold lines 42a,b,c,d and permanent closure strip 20 is fastened to the inside surface of end 18, for example with adhesive 50. Plastic or plastic coated versions can be heat welded. Bottom 24 is likewise formed by folding flap 26 along score line 45, bottom 24 along line 43a, and ends 16,18 along lines 43c,b respectively. In each case the panels are folded toward the inside until box bottom 24 is perpendicular to front 12 and back 14. Slits 44a,b are provided for ease of folding bottom 24 along score line 45 and insertion of tabs 17b and 19b, of sides 16 and 18 respectively. Removable closure panel 31 is formed of folded portion and tuck-in tab 32. Top 30 is formed by folding the tuck-in flap 32 along lines 48 and top 30 along scored line 46 and perforated line 36. Scored line 46 can alternatively be a less deeply perforated line as compared to line 36, whereby the closure flap 32 folds easily but tears preferentially along line 36, including at the dip of cutout portion 34. Tabs 17a and 19a are folded inward. Folding is facilitated by slits 47a,b on fold line 48.

Figure 2:
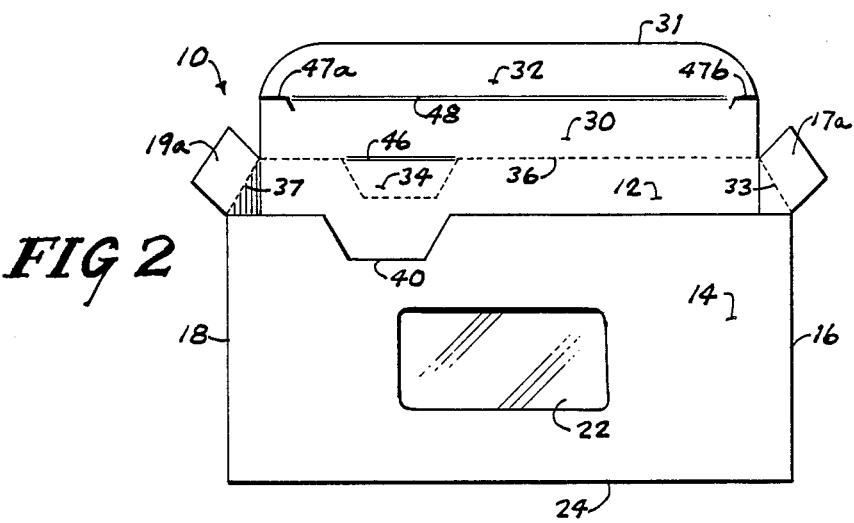
FIG. 2 is a front perspective view of the folded blank forming the box of this invention, with the tuck-in closure panel intact.

When completely folded, but not closed, the box of FIG. 2 results. The box as illustrated in FIG. 2 is assembled as ready to receive contents for shipping When made of sufficiently sturdy paperboard or the like and closed by folding over the closure panel and tucking flap 32 between the contents and front wall 14, no other protection need be provided for the enclosed contents, e.g., the cassette, perhaps itself enclosed in an inner box. Window 22 is provided by cutting a window 22 in side 14 and covering the window with a sturdy transparent sheet 23, such as cellophane or a polyvinyl. Window 22 can be die cut when originally cutting out blank 11. Although window 22 is optional, it has the advantage of being able to identify the contents of box 10 without opening the box.

Figure 3:
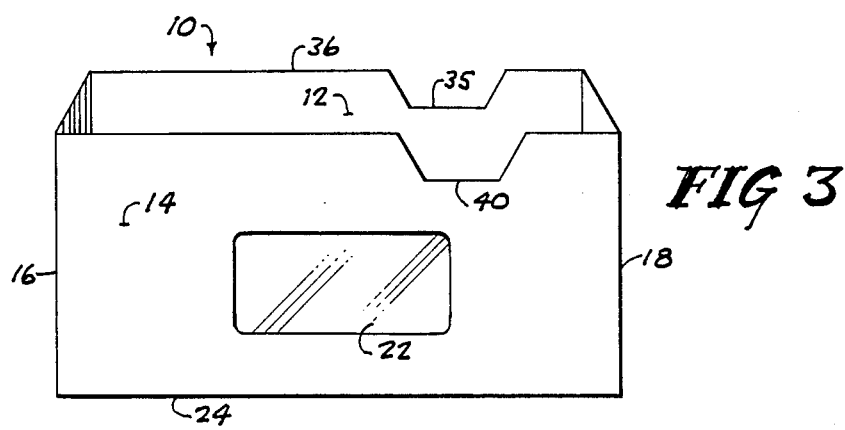
FIG. 3 is a front perspective view of the folded box of this invention with the closure panel torn off along the perforations to define a partial enclosure with facing cutouts for grasping.

Now referring to FIGS. 1, 2 and 3, the transformation of the shipping box of FIG. 2 into the storage/display box of FIG. 3 is illustrated. Once the box is assembled and the tape inserted, the cassette is handled, sold and/or shipped to the user in the box of FIG. 2. For user storage convenience, access to the stored cassette is facilitated by removing the closure flap 31, i.e., reforming the box to the sleeve configuration of FIG. 3. The user tears the portions of top 30 and side tabs 17a and 19a along perforation 33,36,37 to remove the panel 31 and form the box as illustrated in FIG. 3. The advantage of box 10 as a storage/display of a cassette is chiefly in the forming of facing cutaway areas 40 and 35. Area 40 on front top edge 41 is cutaway from the paper sheet in the first step (as seen in FIG. 1). Area 35 is formed when top 30 and portion 34 of back 12 are torn from side 12 along perforations 36. Tabs 17a and 19a are also torn along perforations 33 and 37, respectively. The entire top portion of box 10 is thereby opened and a user is able manually to grasp a cassette exposed at cutaway areas 35,40 and remove it without opening and closing box 10, yet the cassette remains protected, with the identification on its spine and on its front easily visible from the top of box 10 or through window 22.

The invention concerns a box for storing an article, the box 10 comprising a top 30, bottom 24, front 14, back 12 and opposing end portions 16,18 defining an enclosure for the article. Front 14 includes a top edge 41 defining a cutaway portion 40 at which the article protrudes beyond the top edge. The back 12 includes a removable closure panel 31 foldably attached to back 12 along perforated line 36. Line 36 also defines portion 34, which when removed becomes cutaway portion 35, dipping into back 12 opposite the front cutaway portion 40. The removable closure panel 31 is folded along line 36,48 to close box 10, or it may be removed by tearing along lines 36,33,37 to form a sleeve-shaped container wherein opposing cutaway sections 35,40 provide access for grasping the article on opposite sides.

Preferably top 30, bottom 24, front 14, back 12, opposing end portions 16,18, and closure panel 31 are integrally connected, preferably formed from a single sheet of material such as paperboard, plastic, plastic-coated paper, vinyl, vinyl-coated paper, card stock, or the like foldable material. Front 14 preferably has window opening 22 covered by at transparent sheet 23. Tabs 17a,b and 19a,b are foldable under removable closure panel 31 and bottom 24. Removable closure panel 31 is preferably a tuck-in flap 30 having a distal end 32 insertable between the article and back 12. For ease of assembly, fold lines 36,48 45,46,33,36,37 are scored, however, for ease of removal, lines 33,36,37 are weakened, preferably by perforations. The area 46 on line 36 best remains scored, not perforated.

Box 10 is dimensioned for an article being one of video cassette and audio cassette.

Having now illustrated and described my invention, it is not intended that such description limit this invention, but rather that this invention be defined only by reasonable interpretation of the appended claims.

I claim:

1. A box for storing an article comprising:

a top, bottom, front, back and opposing end portions defining an enclosure for the article, said front including a top edge, said top edge defining a front cutaway portion, said back including a removable closure panel foldably attached to said back along a perforated line, said line being weakened and defining a cutaway portion in said back dipping into said back opposite said front cutaway portion, whereby the removable closure panel can be folded along the line to close the box and the removable closure panel can be torn along said line to form a sleeve-shaped container wherein said opposing cutaway sections provide access for grasping the article on opposite sides.

2. The box according to claim 1, wherein said top, bottom, front, back and end portions and removable closure panel are integrally connected.

3. The box according to claim 2, wherein said box is formed from a sheet.

4. The box according to claim 1, further comprising a window opening in said box front.

5. The box according to claim 4, further comprising a transparent sheet overfitting said window opening and adhered to edges defining said window.

6. The box according to claim 1, wherein said box is formed from at least one of paperboard, plastic, plastic-coated paper, vinyl, vinyl-coated paper, and card stock.

7. The box according to claim 3 wherein ends of said sheet are joined.

8. The box according to claim 7, further comprising tabs foldable under said removable closure panel.

9. The box according to claim 1, wherein said removable closure panel is a tuck-in flap having a distal end insertable to lie against an inner surface of said front.

10. The box according to claim 1, wherein said box is dimensioned rectilinearly, whereby said box may closely over-fit a rectilinear article.

11. The box according to claim 10, wherein said box is dimensioned for an article being one of video cassette and audio cassette.

12. The box according to claim 1, wherein said line is perforated.

13. The box according to claim 1, wherein said line is scored.

14. The box according to claim 1, wherein said line is perforated along the edge and rear cutaway portion, and scored colinearly over the rear cutaway portion at the top edge.

15. The box according to claim 1, wherein said line is weakened along the edge and rear cutaway portion and less weakened colinearly over the rear cutaway portion at the top edge.

16. In combination, a box and an article allowing for shipping and storing of the article comprising:

the box having a top, bottom, front, back and opposing end portions defining an enclosure for the article, said front including a top edge, said top edge defining a front cutaway portion at which the article protrudes beyond the top edge, said back including a removable closure panel foldably attached to said back along a perforated line, said line being weakened and defining a rear cutaway portion in said back dipping into said back opposite said front cutaway portion, whereby the removable closure panel can be folded along the line to close the box and the removable closure panel can be torn along said line to form a sleeve-shaped container wherein said opposing cutaway section s provide access for grasping the article on opposite sides.

17. The combination according to claim 16, wherein said box further comprises tabs on the opposing end portions, foldable under said removable closure panel.

18. The combination according to claim 16, wherein said removable closure panel has a tuck-in flap having a distal end insertable to lie against an inner surface of the front, between the article and said front.

19. The combination according to claim 16, wherein said box is dimensioned for closely fitting a rectilinear article.

20. The combination according to claim 16, wherein said article is a tape cassette.

21. The combination according to claim 16, further comprising a window in said box front.

22. The combination according to claim 21, further comprising a transparent sheet overfitting said window and adhered to edges defining said window.

23. The combination according to claim 16 wherein said article is a magnetic tape cassette.

24. The combination according to claim 16 wherein said integral sheet is one of paperboard, plastic, plastic-coated paper, vinyl, vinyl-coated paper, and card stock.

* * * * *

UNITED STATES PATENT AND TRADEMARK OFFICE
CERTIFICATE OF CORRECTION

PATENT NO. : 4,978,009

DATED : December 18, 1990

INVENTOR(S) : William Pany

It is certified that error appears in the above-identified patent and that said Letters Patent is hereby corrected as shown below:

In column 2, line 2 following the word "fully", insert the word -- removable --.

In column 2, line 23 following the word "a", insert the word -- cutout --.

In column 5, line 17 (Claim 1) following the word "a", insert the word -- rear --.

Signed and Sealed this

Thirteenth Day of October, 1992

*Attest:*

DOUGLAS B. COMER

*Attesting Officer*  *Acting Commissioner of Patents and Trademarks*